United States Patent [19]
Ek et al.

[11] 4,109,776
[45] Aug. 29, 1978

[54] APPARATUS FOR MARKING AN INFORMATION CARRYING MEDIUM

[75] Inventors: Birger Henrik Ek, Sundbyberg; Sven Gunnar Valter Stenudd, Lidingo, both of Sweden

[73] Assignee: Facit Aktiebolag, Atvidaberg, Sweden

[21] Appl. No.: 849,861

[22] Filed: Nov. 9, 1977

[30] Foreign Application Priority Data

Nov. 10, 1976 [SE] Sweden .................................. 7612496

[51] Int. Cl.² .............................................. B41J 9/00
[52] U.S. Cl. .................................. 400/124; 101/93.34; 101/93.48; 346/141; 400/364; 400/384
[58] Field of Search ............. 197/1 R, 49; 101/93.48, 101/93.04, 93.29–93.34; 346/141

[56] References Cited
U.S. PATENT DOCUMENTS

| 1,564,633 | 12/1925 | Side | 346/141 |
| 3,427,635 | 2/1969 | Siegelman et al. | 346/76 |
| 3,968,867 | 7/1976 | Stenudd | 197/1 R |

Primary Examiner—Clyde I. Coughenour
Attorney, Agent, or Firm—Alfred E. Miller

[57] ABSTRACT

In a marking device for marking an information carrying medium, a marking tip is provided on an arm, and the arm is resiliently mounted by means of a leaf spring. In order to relieve stresses on the joints between the leaf spring and the arm, a region of the leaf spring to which the arm is affixed is bent, so that one portion of the leaf spring is affixed to the side of the arm toward the information carrying medium, and another portion of the leaf spring is affixed to the opposite side of the arm.

14 Claims, 2 Drawing Figures

APPARATUS FOR MARKING AN INFORMATION CARRYING MEDIUM

BACKGROUND OF THE INVENTION

This invention relates to an apparatus for printing characters on or punching holes in an information carrying medium, wherein a marking means for marking the medium is provided for striking or being pressed against a surface of the medium, and wherein one of the ends of an elongated arm extending mainly parallel to the surface, is equipped with or has the form of said marking means. In this apparatus the arm is resiliently connected with a frame or another support by means of a leaf spring, one portion of the leaf spring being stationary in relation to a drive device so that the arm is resiliently movable in a direction to or from the surface under the influence of the drive device.

In devices of this kind the arm and the leaf spring are connected to each other in such a way that the arm is supported by the leaf spring only at one of its sides, i.e. the joint between the arm and the spring forms an ordinary lap-joint. When the marking device on the arm strikes or presses against the information carrying medium, considerably forces arise, and these forces are transmitted directly to said joint. The joint will then be subjected to a force tending to break or pry the joint open. This has a detrimental effect on the life of the joint, and especially in high speed matrix printers, the known marking devices therefore may cause serious problems.

It is therefore an object of this invention to greatly increase the life of arrangements of the above described type by improving the joining of arm and leaf spring, so that the joint can resist greater forces than the devices known without difficulty.

BRIEF DESCRIPTION OF THE INVENTION

According to the invention, this is achieved by bending the portion of the leaf spring attached to the arm such that it is attached at one section of the arm to the side of the arm facing the information carrying medium, and at a section of the arm separated therefrom it is attached to the opposite side of the arm.

BRIEF DESCRIPTION OF THE DRAWINGS

In order that the invention will be more clearly understood, it will now be disclosed in greater detail, with reference to the accompanying drawings, wherein.

DETAILED DESCRIPTION OF THE INVENTION

Figure 1:
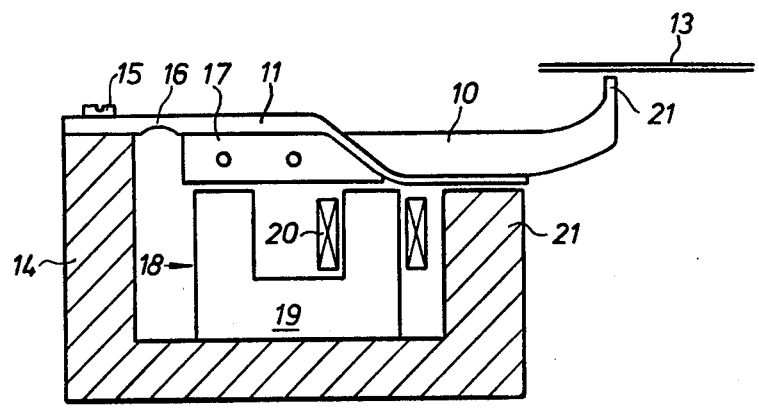
FIG. 1 is a side view, partially in cross-section, of a marking apparatus in accordance with the invention.

In the Figures the arm is designated by the reference numeral 10 and the leaf spring by the reference numeral 11. The free end of the arm 10 is provided with a point 12 intended to engage a record medium 13. For example only, in matrix printers, this point can be employed to make a pointwise indication on the medium 13 or, in other types of printers, this point can be equipped with some character for direct recording of a complete character. The record or information carrying medium 13 can, for example, be a pressure-sensitive paper or an ordinary paper. In the latter case a ribbon or the like (not shown) is, of course, required between the point 12 and the medium 13. Finally, instead of the above recording techniques, the point 12 may be formed to punch holes in the medium in order to attain the desired record.

The other end of the leaf spring 11 is attached to a support 14, (only diagrammatically shown) in the form of a frame or the like, e.g. by means of screws 15. At the transition between the arm 10 and the support 14 the leaf spring 11 has a reduced section 16. This transition supplies the necessary resiliency to the spring. The rear end of the arm 10 is provided with an armature 17, which is preferably riveted and/or soldered to the arm 10 as well as to the leaf spring 11. An electromagnet 18 consisting of a core 19 and a coil 20 is affixed to the support 14 and it is positioned so that when it is energized it attracts the armature 17 and thereby also the arm 10. The movement of the arm is limited, by the pole surface of the magnet and also by a projection 21 extending from the support.

Thus, in the embodiment shown, energizing of the electromagnet moves the arm 10 and thereby its point 12 away from the record medium 13. When the magnetizing current is abruptly cut off the arm 10, owing to the spring force in the section 16 of the leaf spring, will swing out so that the point 12 will strike against the record medium.

The arm 10 is preferably an elongated, flat element, with its major surfaces extending perpendicular to the major surfaces of the leaf spring 11. The edge surfaces of the arm are secured to the leaf spring, preferably by soldering. As is best seen in FIG. 1, the leaf spring is bent so that the portion near the point 12 is secured to the edge surface of the arm not facing the record medium while the portion near the section 16 is secured to the other edge surface of the arm. Thus, the forces arising when the point 12 strikes the record medium 13 will act as compressing forces along the whole joint between the arm and the leaf spring, i.e. no forces act to pry open or break the joint.

For insertion of the arm, the leaf spring is slotted at its bent portion, and owing to the fact that the arm and the leaf spring are also soldered together at this region, reliable guiding of the arm is obtained also in the lateral direction.

Figure 2:
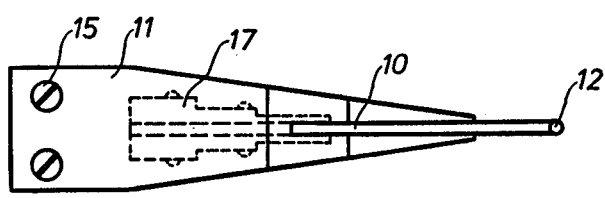
FIG. 2 is an upper plan view of the marking device of FIG. 1.

In FIG. 2 the leaf spring as well as the armature are shown as tapering towards the point 12 of the arm. Moreover, the leaf spring is thinner from the bent portion thereof out to its free end. As a result, the combination spring-arm-armature is provided with a favorable mass distribution so that the moment of inertia will be optimized with respect to strength and rigidity.

While the invention has been disclosed with reference to a single embodiment, it will be apparent that variations and modifications may be made therein. Thus, the spring may be mounted to bias the arm either toward or away from the recording information medium, with the drive mechanism thereby being arranged to drive the arm away from the recording medium (as shown) or toward the recording medium, respectively. It is therefore intended in the following claims to cover each such variation and modification as falls within the true spirit and scope of the invention.

What is claimed is:

1. In an apparatus for marking an information carrying medium wherein an elongated arm extends generally parallel to said information carrying medium and carries a marking device on one end thereof positioned to engage said information carrying medium, the arm is affixed to a leaf spring for resiliently biasing the arm in a first direction substantially normal to the surface of the information carrying medium, and a drive means is provided for moving the arm in a second direction opposite said first direction; the improvement wherein said leaf spring is bent, with one portion thereof being affixed to a first side of said arm facing said information carrying medium, and another portion of said leaf spring is affixed to the second side of said arm away from said information carrying medium.

2. The apparatus of claim 1 wherein the portion of said leaf spring toward said one end of said arm is affixed to said second side of said arm.

3. The apparatus of claim 1 wherein said arm is substantially flat, the plane of said arm being substantially perpendicular to the major surfaces of said leaf spring.

4. The apparatus of claim 1 wherein one end of said leaf spring is affixed to said arm and the other end is rigidly held to a support, and said leaf spring has a portion of reduced thickness between the ends thereof for forming the resilient portion of said leaf spring.

5. The apparatus of claim 4 wherein the variations of thickness of said leaf spring at said reduced thickness portion are continuous.

6. The apparatus of claim 1 wherein said drive means comprises an armature affixed to said arm, and an electromagnet cooperatively mounted to drive said arm for controlling the marking of said information carrying medium.

7. The apparatus of claim 6 wherein said armature is riveted to said leaf spring.

8. The apparatus of claim 6 wherein said armature is soldered to said leaf spring.

9. The apparatus of claim 6 wherein said leaf spring is biased to move said arm towards the information carrying medium, and said armature and electromagnet are mounted to move said arm away from said information carrying medium when energized.

10. The apparatus of claim 1 wherein said leaf spring has a longitudinally extending slot through which said arm extends, the bent portion of said leaf spring being in the region of said slot, whereby said leaf spring is affixed to said first and second sides of said arm at the opposite ends of said slot.

11. The apparatus of claim 10 wherein said leaf spring tapers toward the end thereof toward said one end of said arm.

12. The apparatus of claim 10 wherein the portion of said leaf spring affixed to the portion of said arm toward said one end of said arm has a thickness less than the portion of said leaf spring affixed to the portion of said arm away from said one end of said arm.

13. The apparatus of claim 10 wherein said drive means comprises an armature affixed to said arm, said armature tapering toward said one end of said arm.

14. The apparatus of claim 1 wherein said leaf spring is bent in the portion thereof between the portions affixed to said first and second sides of said arm.

* * * * *